March 7, 1950     F. J. REYES     2,499,683
CORNER JOINT
Filed March 12, 1946
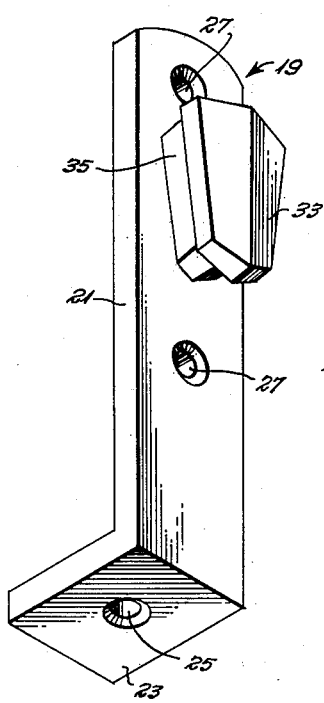
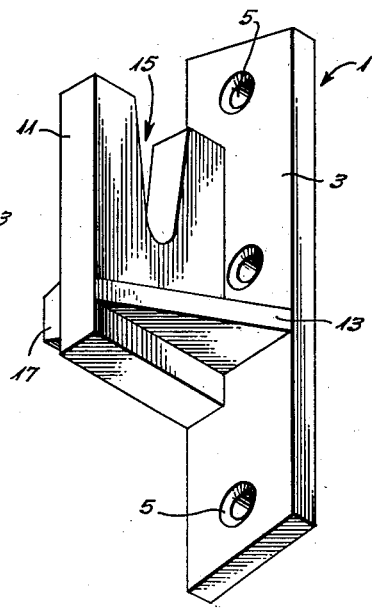
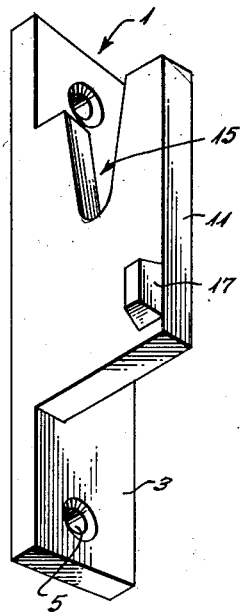
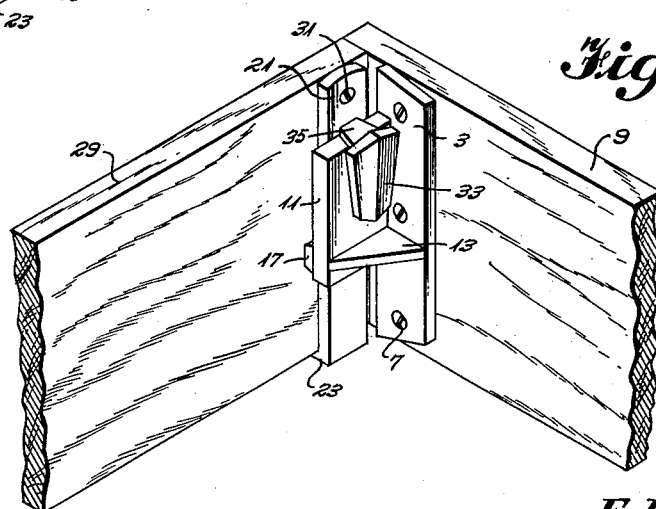
INVENTOR
*Felix J. Reyes*
BY *Peck & Peck*
ATTORNEYS Patented Mar. 7, 1950

2,499,683

UNITED STATES PATENT OFFICE 2,499,683

CORNER JOINT

Felix J. Reyes, Jovellanos, Cuba

Application March 12, 1946, Serial No. 653,816
In Cuba March 16, 1945

1 Claim. (Cl. 20—92)

This invention relates broadly to the art of joining angularly disposed members together and in its more specific aspects, it relates to the construction and operation of a pair of complementary elements which are adapted to be secured to angularly disposed members for removably attaching the latter together; and the nature and objects of the invention will be readily recognized and understood by those skilled in the arts to which it relates in the light of the following explanation and detailed description of the accompanying drawings illustrating what I at present believe to be the preferred embodiments and mechanical expressions of the invention from among various other forms, arrangements, combinations, and constructions of which the invention is capable within the spirit and scope thereof.

It is an object of my invention to provide a pair of complementary metal plates adapted to removably join together two angularly disposed members.

A further object of my invention is to so construct and cast such elements that they will be endowed with unusual strength and structural characteristics to resist breakage or deformation in actual usage.

It is also an object of my invention to provide a pair of complementary elements designed for the functions described which when attached to members to be joined together, may be removably associated with facility.

It is also a characteristic of my invention to provide a pair of complementary elements which, when fastened to angularly disposed members to be joined together, may be easily joined together.

An additional purpose of my invention is to provide guide means on one of the complementary elements of the two which are adapted to be joined together, for facilitating the joining thereof.

With the foregoing general objects, features and results in view, as well as certain others which will be apparent from the following explanation, the invention consists in certain novel features and designs, construction, mounting and combination of elements, as will be more fully and particularly referred to and specified hereinafter.

Referring to the accompanying drawings:

Fig. 1 is a view in perspective of the male member of the corner joint assembly.

Fig. 2 is a view in perspective showing the outer or front face of the female member of the corner joint assembly.

Fig. 3 is a view in perspective showing the inner or rear face of the female member of the corner joint assembly.

Fig. 4 is a perspective view of the assembly mounted in operative position on two elements to be connected together, the two members of the corner joint assembly being joined together connecting the elements.

In the accompanying drawings, I have used the numeral 1 to designate in its entirety the female member of the corner joint assembly which is preferably though not necessarily of cast metal and includes a base plate 3 having several perforations or apertures 5 therein for the reception of screws or the like 7 for securing the female member on an element 9 (see Fig. 4 of the drawings).

The base plate 3 of the female member is provided with a supporting element 11 projecting outwardly from a longitudinal edge of the front face of the base plate, the supporting element extending at substantially right angles to the base plate and being of less length than the base plate. An integral substantially triangular reinforcing rib or web 13 extends between the supporting element 11 and base plate 3.

The supporting element is cast with an upwardly diverging or flaring slot 15 open at its upper end and extending downwardly from a substantially central location along the upper transverse edge of the supporting element. It will be evident that the slot 15 is of downwardly narrowing form.

A guide lug or projection 17 projects from the rear face of base plate 3 at the lower corner thereof, removed from the base plate. The purpose of lug 17 will be explained and made clear hereinafter.

I have used numeral 19 to generally designate the male member of the assembly which comprises a base plate 21 having a foot 23 angularly extending from one end of the base plate 21, the foot having a screw receiving aperture 25 therein and the base plate 21 having screw receiving apertures 27 therein for mounting the male member on an element 29 by means of screws or the like 31.

I cast on the male member a locking head 33 which is spaced from base plate 21 by a neck 35, the head 33 being a substantially flat plate-like member of greater width and length than the width and length of the neck. The neck and head are formed on the base plate adjacent to but removed from the end thereof opposite to the end from which the foot 23 extends, In using the corner joint assembly to removably fasten two elements together, for instance, elements 9 and 29 of Fig. 4 of the drawings, the male and female elements are mounted on the elements as illustrated in Fig. 4 of the drawings. The element 29 which carries the male member is brought into proper position with neck 35 above slot 15, whereupon the neck is slid into the slot, the head being on the outer side of base plate 11. Thus, it will be recognized that elements 9 and 29 are removably associated together, and may only be separated by upward movement of element 29 relative to element 9 to release the neck 35 and head 33 from slot 15.

The guide lug 17 plays an important role in aiding in the proper positioning of element 29 and the male member relative to element 9 and the female member. By forming all of the parts within certain relative dimensions, the distance from the lug to the upper transverse edge of the supporting element 11 is less than the distance from the lower end of head 33 to the lower edge of base plate 21, from which foot 23 extends. Thus, in positioning element 29 for sliding neck 35 into slot 15, the lower longitudinal edge of base plate 21 will engage lug 17 and the neck will be properly guided into slot 15. Were the lug not so located, great difficulty would be encountered in properly positioning the neck for insertion in the slot.

What I claim as new and desire to secure by Letters Patent in the United States is:

A corner joint assembly including male and female members for removable supporting association together, said female member comprising a base plate and a supporting element projecting therefrom and having a guide lug projecting laterally from a lower corner thereof removed from said base plate, said supporting element having a slot therein downwardly extending from the upper edge thereof and closed at the bottom, and said male member comprising a base plate and means projecting therefrom for supporting insertion in the slot, said means being spaced from the lower end of the base plate of the male member a greater distance than the distance between the guide lug and the upper end of the supporting element, whereby said means will be guided into the slot by contact between the base plate of the male member and the lug.

FELIX J. REYES.

REFERENCES CITED

The following references are of record in the file of this patent:

UNITED STATES PATENTS

| Number | Name | Date |
|---|---|---|
| 375,645 | McCormick | Dec. 27, 1887 |
| 725,330 | Foster | Apr. 14, 1903 |
| 1,472,490 | Oakes | Oct. 30, 1923 |

FOREIGN PATENTS

| Number | Country | Date |
|---|---|---|
| 177,719 | Great Britain | Apr. 6, 1922 |
| 217,489 | Great Britain | June 19, 1924 |
| 244,050 | Great Britain | Aug. 26, 1926 |